Figure 1:
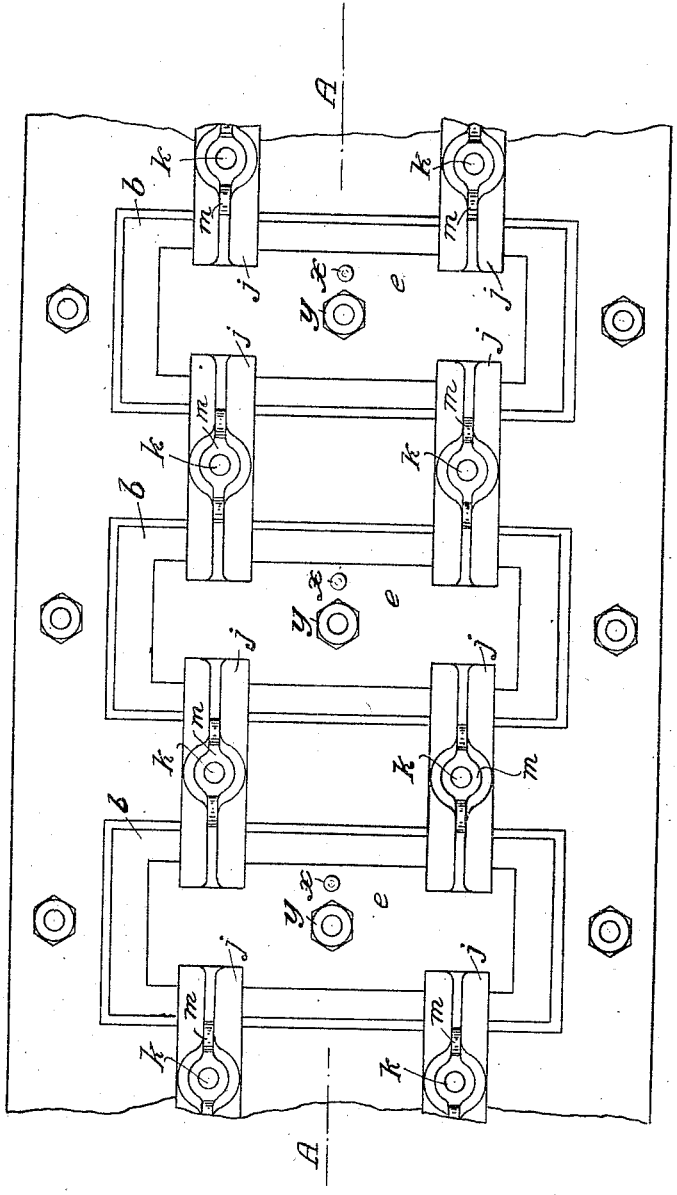

W. H. LOWE.
ELECTRIC BATTERY.
APPLICATION FILED MAR. 23, 1912.

1,044,549.

Patented Nov. 19, 1912.
2 SHEETS—SHEET 1.

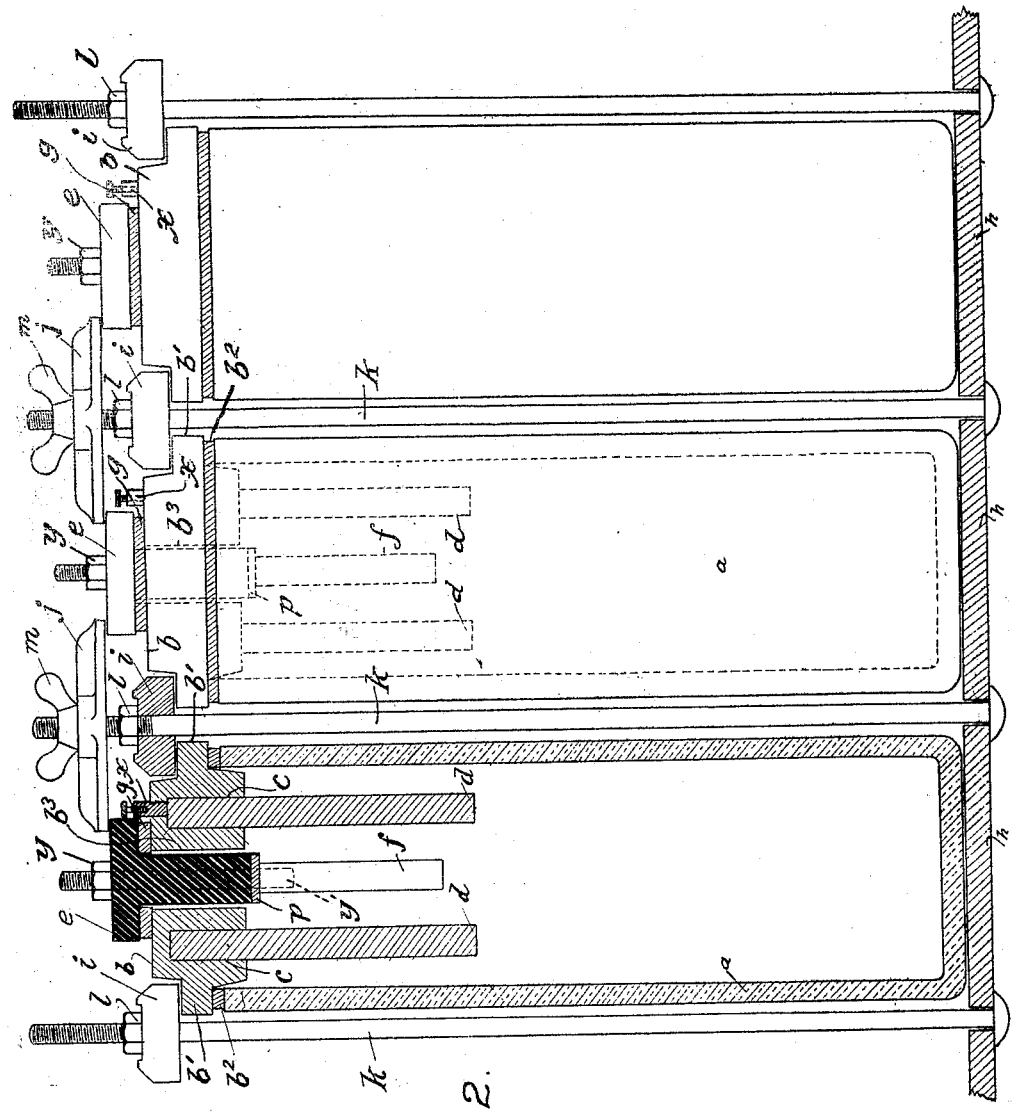

UNITED STATES PATENT OFFICE.

WILLIAM HERBERT LOWE, OF BRONDESBURY, ENGLAND, ASSIGNOR TO THE FLOAT ELECTRIC COMPANY, LIMITED, OF NEW KENT ROAD, ENGLAND.

ELECTRIC BATTERY

1,044,549.  Specification of Letters Patent. Patented Nov. 19, 1912.

Application filed March 23, 1912. Serial No. 685,807.

*To all whom it may concern:*

Be it known that I, WILLIAM HERBERT LOWE, a subject of the King of Great Britain, residing at 35 Mowbray road, Brondesbury, in the county of Middlesex, England, have invented new and useful Improvements in Electric Batteries, of which the following is a specification.

This invention relates to details of construction of electric batteries, the cells being of simple construction. Improved means are also provided for supporting the electrodes in the covers of the cells and improved means are provided for securing the cells and for closing the same.

The drawings illustrate a battery made in accordance with this invention.

Figure 1 is a plan and Fig. 2 is a vertical section on the line A—A Fig. 1.

Each cell $a$ is provided with a lead cover $b$ having sockets $c$ in which the carbon electrodes $d$ are secured. On the cover $b$ are flanges $b'$ which rest on the walls of the cell, a rubber packing $b^2$ being inserted between them. In the cover $b$ is an aperture $b^3$ into which fits an insulating piece or holder $e$ carrying the zinc electrode $f$, a rubber packing $g$ being inserted between the insulating piece $e$ and the cover $b$.

The cells $a$ are carried by a base plate $h$ and are attached to it by means of yokes $i$ and $j$ on rods $k$ the yokes being of insulating material or of metal properly insulated and being secured on the rod by screw nuts $l$ and $m$. The yokes $i$ engage with the flanges $b'$ of the cover $b$ and the yokes $j$ engage with the insulating pieces or holders $e$ of adjacent cells, thus at the same time securing the cells to the base plate and closing the cells.

In the drawings the cells are shown rectangular but they may be made cylindrical if desired without departing from the invention.

$p$ indicates a washer surrounding the zinc electrode at the bottom of the insulating piece $e$.

The electrical connections of the electrodes may be made in any suitable way, one wire being attached to the zinc electrode as by means of a nut carried by the electrode and by a rivet or pin extending through the cover $b$ and connected with the carbon electrode.

Each carbon element $d$ may be provided with a binding post $x$ of ordinary construction for the circuit connections and each zinc element may be connected with the circuit wires by means of a nut $y$ or in any other suitable way. In the drawings each zinc element $f$ may carry a rod $y'$ extending through the holder $e$ and threaded at its upper end to receive the nut $y$. A washer $p$ may be interposed between the zinc and the lower end of the holder.

What I claim is:—

1. In a reversible electric battery the combination of a cell, a cover having a flange resting on the wall of the cell having an aperture through it and a socket on its inner side, clamping means for securing the cover in liquid-tight contact with the wall of the cell, a carbon electrode secured in the socket, a zinc electrode passing through the aperture, and means for securing the zinc electrode to the cover by a liquid-tight connection.

2. In an electric battery, cells, covers to the cells carrying the carbon electrodes, apertures in the covers, zinc electrodes and holders for the same, both passing through the apertures, a base plate, rods attached to the base plate, yokes engaging with the holders for zinc electrodes of adjacent cells, other yokes engaging with the covers of adjacent cells and means for securing the yokes to the rods.

3. In an electric battery, cells, lead covers, sockets in the covers, carbon electrodes secured in the sockets, apertures in the covers, zinc electrodes and holders for the same, both passing through the apertures, flanges on the covers resting on the walls of the cells, a base plate, rods attached to the base plate, yokes engaging with the holders for the zinc electrodes of adjacent cells, other yokes engaging with the flanges on the covers of adjacent cells and means for securing the yokes to the rods.

WILLIAM HERBERT LOWE.

Witnesses:
 HERBERT D. JAMESON,
 C. P. LIDDON.